United States Patent [19]

Trepka et al.

[11] E Patent Number: Re. 32,533

[45] Reissued Date of Patent: Oct. 27, 1987

[54] HYDROCARBON FUELS WITH CARBURETOR DETERGENT PROPERTIES

[75] Inventors: William J. Trepka; Richard J. Sonnenfeld, both of Bartlesville, Okla.

[73] Assignee: Phillips Petroleum Company, Bartlesville, Okla.

[21] Appl. No.: 395,553

[22] Filed: Jul. 6, 1982

Related U.S. Patent Documents

Reissue of:

[64] Patent No.: 2,091,980
Appl. No.: 8,311,979

[51] Int. Cl.[4] ..... C10L 1/22

[52] U.S. Cl. ..... 44/62; 44/63; 44/72; 44/77; 44/78; 525/250; 525/272; 525/366; 525/374; 525/379; 525/382

[58] Field of Search ..... 44/62, 63, 72, 77, 78; 252/DIG. 2

[56] References Cited

U.S. PATENT DOCUMENTS

| | | | |
|---|---|---|---|
| 3,170,903 | 2/1965 | Stearns | 260/94.2 |
| 3,214,498 | 10/1965 | Bauer | 260/882 |
| 3,251,664 | 5/1966 | Dickson et al. | 44/66 |
| 3,259,578 | 7/1966 | Dickson et al. | 252/34 |
| 3,378,492 | 4/1968 | Song et al. | 252/51 |
| 3,419,365 | 12/1968 | Streets | 44/62 |
| 3,492,369 | 1/1970 | Naylor | 260/879 |
| 3,554,911 | 1/1971 | Sciff et al. | 252/59 |
| 3,567,798 | 3/1971 | Haefele et al. | 260/880 R |
| 3,600,311 | 8/1971 | Nalman et al. | 252/59 |
| 3,751,384 | 8/1973 | Langer, Jr. | 252/431 N |
| 3,781,260 | 12/1973 | Halasa | 260/94.7 A |
| 3,923,930 | 12/1975 | Waldbilly | 260/878 R |
| 3,925,511 | 12/1975 | Loveless | 260/880 R |
| 3,976,628 | 8/1976 | Halasa et al. | 260/880 B |
| 4,022,589 | 5/1977 | Alquist et al. | 44/58 |
| 4,145,298 | 3/1979 | Trepka | 252/51.5 |

FOREIGN PATENT DOCUMENTS 441050 7/1969 Australia .

OTHER PUBLICATIONS

Encyclopedia of Polymer Science & Technology, vol. 9, 1968, pp. 842–852 by L. E. Coleman.

*Primary Examiner*—Jacqueline V. Howard
*Attorney, Agent, or Firm*—Lyell H. Carver

[57] ABSTRACT

Carburetor detergency properties of hydrocarbon fuels are provided by nitrogen-containing organic compound-grafted, hydrogenated conjugated diene-monovinylarene copolymers.

69 Claims, No Drawings

HYDROCARBON FUELS WITH CARBURETOR DETERGENT PROPERTIES

Matter enclosed in heavy brackets [ ] appears in the original patent but forms no part of this reissue specification; matter printed in italics indicates the additions made by reissue.

*This is a reissue application of application Ser. No. 71596, filed Aug. 31, 1979, now U.S. Pat. No. 4,238,202, patented Dec. 9, 1980.*

FIELD OF THE INVENTION

The invention relates to improved hydrocarbon fuel compositions.

BACKGROUND OF THE INVENTION

Nearly all liquid hydrocarbon fuels are formulated with one or more of a variety of additives to enhance or impart desirable properties. The high quality of modern fuels results in part from the use of additives. The importance of additives to provide detergent properties to hydrocarbon fuel compositions, such as gasolines, is discussed in U.S. Pat. No. 4,022,589 by Alquist and Ebersole. Maintaining clean intake manifolds and other carburetor parts is important in maintaining minimum fuel consumption and minimum emissions. Needed still are fuel-soluble ashless additives of high detergent effectiveness at very low use-levels.

BRIEF SUMMARY OF THE INVENTION

We have discovered hydrocarbon fuel compositions that exhibit excellent detergent properties. The detergent properties are obtained by incorporating a small effective amount of an additive which is a nitrogen-containing organic compound-grafted, hydrogenated, conjugated diene/monovinylarene copolymer. These nitrogen-containing copolymers must have a number average molecular weight below about 10,000. Related but higher molecular weight types are known as lubricating oil additives. Unexpectedly, we have discovered that these higher molecular weight types are not useful in fuels; that our low molecular weight types are not useful in lube oils, but rather are highly effective as detergents in liquid hydrocarbon fuels.

DETAILED DESCRIPTION OF THE INVENTION

Hydrocarbon Fuel Compositions

In accordance with our invention, the nitrogen-containing copolymeric additives are incorporated as needed into hydrocarbon fuels using any suitable procedures. The additives can be added by any convenient mixing and dilution methods.

The nitrogen-containing copolymers find application in use in liquid hydrocarbon fuels, more specifically internal-combustion engine liquid fuels, in any broad effective range. A suggested broad amount is in the range of such as about 1 to 30 pounds (0.45 to 13.6 kilograms) per 1000 barrels of fuel (42 U.S. gal/bbl). For most usages, the presently preferred range is about 2 to 20 pounds (0.91 to 9.1 kilograms) per 1000 barrels of fuel.

The fuels employed are compositions comprising straight chain paraffins, branched chain paraffins, olefins, aromatic hydrocarbons and naphthenic hydrocarbons. These fuels will generally have initial boiling points of about 70° F. and final boiling points of about 450° F. (ASTM D-86). The specifications for conventional gasolines are set forth in ASTM D-439-70. The fuel components can be derived by any of the conventional refining and blending processes, such as straight run distillation, thermal cracking, hydrocracking, catalytic cracking and various reforming processes. Synthetic fuels are also included.

The motor fuel particularly suitable for use with the additive system of this invention is an essentially unleaded fuel which boils in the conventional motor fuel range of from about 70° F. to about 450° F.

If desired, the additives can be supplied as additive concentrates for easier later mixing with hydrocarbon fuels. Concentrates can be prepared by dissolving the nitrogen-containing organic compound-grafted hydrogenated conjugated diene/monovinylarene copolymer detergent in a volatile solvent, such as one which boils in the range of about 150° to 400° F. (65° to 204° C.). Aliphatic alcohols and aromatic or saturated aliphatic hydrocarbons are suitable, such as isopropanol, benzene, xylene, n-hexane, cyclohexane, and the like. Sufficient solvent is employed to provide a convenient concentrate concentration, containing such as about 10 to 70 weight percent of the detergent additive based on the concentrate (additive plus solvent). If desired, the grafted hydrogenated copolymer cement after removal of hydrogenation catalyst itself can be used as the concentrate to avoid expensive copolymer recovery steps.

In addition to the additives of this invention, the fuel compositions or the preformed concentrate can comprise one or more of other additives known to those skilled in the art, such as dyes, octane improvers, oxidation inhibitors, rust inhibitors, etc.

Additives

The nitrogen-containing grafted hydrogenated copolymers which we employ in hydrocarbon fuels as additives are prepared from a copolymer of at least one hydrocarbon conjugated diene and at least one monovinylarene hydrocarbon, preferably butadiene and styrene. The copolymers are metalated and grafted and hydrogenated. The hydrogenation step can be before metalation, or after grafting. The lithiated (metalated) copolymers are reacted (grafted) with certain nitrogen-containing organic compound or compounds. The resultant hydrogenated polar copolymers are highly stable, resistant to heat-deterioration, resistant to oxidative degradation, are of a type and molecular weight to have good solubility in liquid hydrocarbon fuels and exhibit significant detergent capabilities when incorporated into liquid hydrocarbon fuel.

Conjugated Diene/Monovinylarene Copolymers

In our discussions hereinafter for simplicity and convenience we use styrene as representative of as well as the preferred monovinylarene, and 1,3-butadiene as representative of as well as the preferred conjugated diene. Similarly butadiene/styrene copolymers are discussed as representative of the applicable conjugated diene/monovinylarene copolymers generally.

Suitable conjugated diene monomers are those aliphatic hydrocarbon conjugated dienes of four to eight carbon atoms per molecule. Exemplary conjugated dienes include butadiene, isoprene, 2,3-dimethyl-1,3-butadiene, piperylene, and the like. Suitable monovinylarene monomers are the hydrocarbon monovinylarenes of eight to fifteen carbon atoms per molecule. Exemplary monovinylarenes include styrene, α-methylstyrene, 3-methylstyrene, 3,5-diethylstyrene, 4-tolylstyrene, and the like.

Suitable copolymers will contain about 20 to 70 percent by weight copolymerized styrene, the balance then being copolymerized butadiene, more preferably about 50 to 65 weight percent styrene and the balance butadiene. These copolymers presently preferably are substantially random copolymers, but can contain significant blocks of polystyrene and/or blocks of polybutadiene and/or blocks of random or random tapered butadiene/styrene. These copolymers also can be represented by such as B/A, A-B, and B/A-A, wherein A is a block of polystyrene, B is a block of polybutadiene, and B/A represents either a random copolymer block of butadiene/styrene, or a tapered block of butadiene/styrene, with the realization that B/A also can contain appreciable block structure of polystyrene. The use of the designation B/A when used with reference to tapered random blocks indicates the direction of taper with the B/A blocks. These blocks, while random, gradually decrease in content of the first indicated monomer along the block, due to the mode of preparation used. The block polystyrene A content of the random block copolymer B/A-A preferably should be in the range of less that about 35, more preferably less than about 25, weight percent. For most usages, a block polystyrene A content of less than about 5, and less than about 2.5, weight percent is suitable and effective, such as 0.5–5 weight percent.

The butadiene/styrene copolymers employed to prepare the additives should have a number average molecular weight in the approximate range of 1,000 to 10,000, presently preferred about 5,500 to 8,500. The copolymers, as far as the polymerized butadiene portion, will have a vinyl unsaturation content prior to hydrogenation of about 20 to 95 percent, preferably about 20 to 70 percent. (The vinyl unsaturation content refers to the percentage of the total unsaturated bonds in the polymerized butadiene portion of the copolymer which are in the form of vinyl unsaturation). The copolymers must be of a type and molecular weight which finally modified will provide significant detergency improving properties to the hydrocarbon fuel, and still have sufficient fuel solubility to be formulated into the hydrocarbon fuel.

The copolymers of butadiene/styrene employable in accordance with our invention can be prepared by any suitable techniques known in the art. Most typically, a mixture of butadiene and styrene monomers can be polymerized by contacting the monomers with a hydrocarbon monolithium initiator. Any of the hydrocarbon monolithium initiators known in the anionic solution polymerization arts can be employed. Typically these can be represented by RLi wherein R is a hydrocarbon radical and can be aliphatic, cycloaliphatic, or aromatic, containing at least one carbon atom per molecule. The number of carbon atoms and consequently the molecular weight of the hydrocarbon monolithium initiator is not limited as far as operability is concerned, though those of up to about 20 carbon atoms are more readily available. Most frequently employed are the aliphatic monolithium types. Exemplary species include such as n-butyllithium, sec-butyllithium, N-decyllithium, phenyllithium, 1-naphthyllithium, p-tolyllithium, cyclohexyllithium, 1-eicosyllithium, and the like. The presently preferred species are sec-butyllithium and n-butyllithium for commercial availability. If an n-alkyllithium initiator is employed, it usually is advisable to include a minimal amount of a polar compound, such as tetrahydrofuran, to increase initiator activity and efficiency. Such a polar compound may also act as a randomizer.

Such hydrocarbyl monolithium initiators are employed in an amount effective for polymerization of the monomer charge employed to the molecular weight desired. Typically, an exemplary amount of such initiator would be in the range of about 10 to 100 mhm (millimoles per 100 grams of monomer), presently preferred about 11 to 18 mhm, consistent with obtaining polymers of presently preferred molecular weight ranges.

Polymerization is conducted by contacting the monomer charge with the monolithium initiator in a suitable diluent. Diluents employed for the purpose include any of the paraffinic, cycloparaffinic, or aromatic hydrocarbons known to the art, used alone or in admixture, typically of 4 to 10 carbon atoms per molecule in commercial operations. Exemplary species include such as n-heptane, cyclohexane, n-hexane, benzene, toluene, the xylenes, 2,2,4-trimethylpentane, and the like. Cyclohexane currently is preferred for ease of handling, high solubility of polymer, and availability.

Polymerization can be carried out at any convenient temperature employed in the solution polymerization arts. Suitable and exemplary temperatures lie in the range of from less than about 0° C. to over 200° C., presently preferred about 40° C. to 100° C., since these temperatures are consistent with obtaining the desired copolymers. The pressures employed can be as convenient, though preferably pressures are employed sufficient to maintain monomers and diluent substantially in the liquid phase. The polymerization times can vary widely as may be convenient, and will, of course, be affected by polymerization temperatures chosen. Time preferably should be chosen such that substantially complete conversion of monomers is obtained.

To prepare the A-B copolymeric structure, either styrene or butadiene can be first polymerized and then the other monomer added and polymerized to result in the A-B copolymer.

Alternatively, a mixture of the butadiene and styrene monomers can be copolymerized in desired proportiion under randomizing conditions to produce a B/A copolymer. In another mode, a B/A structure can be first prepared by polymerizing a suitable butadiene/styrene admixture to the desired degree of conversion, and this usually will produce a tapered block since butadiene tends to polymerize somewhat faster to start with, and then subsequently additional sytrene can be added to form an A block onto the first formed B/A block. Alternatively, and presently preferred, a mixture in a suitable ratio of butadiene styrene can be copolymerized, under limited randomizing conditions, and this then permits formation of a preferred B/A-A structure since the faster polymerization of the butadiene exhausts the butadiene, and remaining styrene then block homopolymerizes.

Where a substantially random B/A portion is desired, employment of a randomizing agent can be included at the suitable stage in the polymerization, typically selected from ethers, thioethers, and amines, and others as is known in the art, typically such as tetrahydrofuran, or from the alkali metal alkoxides other than of lithium, typically such as potassium t-butoxide or t-amyloxide.

Randomizing agents suitable for use can be chosen from among the following and similar compounds which can be characterized as moderately active randomizers or strongly active randomizers. Among those compounds that can be generally characterized as moderately active randomizers are tetrahydrofuran and methyl ethyl ether. Randomizers that can be generally characterized as strongly active can be chosen from among 1,2-dimethoxyethane, dimethylether, N,N,N,',N',-tetramethylethylenediamine, bis(2-methoxyethyl) ether, and 1,2-bis(2-methoxyethoxy)ethane. Strongly active randomizers are employed within the range of about 0.05 to 5, preferably about 0.1 to 2.5, parts by weight per hundred parts by weight monomers (phm). Moderately active randomizers are employed within a range of about 1 to 20, preferably within the range of about 1.5 to 15, phm.

Other randomizers of lesser activity include diethyl ether, di-n-propyl ether, di-n-octyl ether and 1,4-dioxane. These compounds are less preferred in view of their comparatively low degree of randomizer activity. These less active randomizers are employed within a range of about 5 to about 100, preferably from about 10 to about 20, parts by weight per hundred parts monomers.

As is known in the art, various substances are known to be detrimental to the initiator, including such as carbon dioxide, oxygen, or water, and the like. It thus is preferable that the reactants, apparatus involved, diluents, and the like, be maintained substantially free of such materials.

Metalation

The butadiene-sytrene copolymer can be metalated and grafted prior to or following hydrogenation. The metalation step conveniently employs an organolithium compound in conjunction with a polar compound to introduce lithium atoms along the copolymeric structure.

The metalation can be carried out by means of a complex formed by the combination of a lithium component which can be represented by $R'(Li)_x$ with a polar metalation promoter. The polar compound and the lithium component can be added separately or can be premixed or prereacted to form an adduct prior to addition to the solution of the copolymer. In the compounds represented by $R'(Li)_x$, the R' is usually a saturated hydrocarbon radical of any length whatsoever, but ordinarily containing up to 20 carbon atoms, and can be an aromatic radical such as phenyl, naphthyl, tolyl, 2-methylnaphthyl, etc., or a saturated cyclic hydrocarbon radical of e.g., 5 to 7 carbon atoms, a monounsaturated cyclic hydrocarbon radical of e.g., 5 to 7 carbon atoms, an unconjugated, unsaturated aliphatic hydrocarbon radical of 1 to 20 carbon atoms, or an alkyllithium having one or more aromatic groups on the alkyl group, the alkyl group containing 1 to 20 carbon atoms. In the formula, $R'(Li)_x$, x is an integer of 1 to 3. Representative species include, for example: methyllithium, isopropyllithium, sec-butyllithium, n-butyllithium, t-butyllithium, n-dodecyllithium, penyllithium, alpha- and beta-naphthyllithium, any biphenyllithium, styryllithium, benzyllithium, any indenyllithium, 1-lithio-3-butene, 1-lithiocyclohexene-3, 1-lithiocyclohexane-2, 1,4-dilithiobutane, 1,4-dilithiobenzene, 1,3,5-trilithiopentane, 1,3,5-trilithiobenzene, and the like.

Lithium adducts of polynuclear aromatic hydrocarbons, such as those described in U.S. Pat. No. 3,170,903, also can be employed, for example, lithium adducts of biphenyl, naphthalene, anthracene or stilbene. Lithium compounds alone usually metalate copolymers containing aromatic and olefinic functional groups with considerable difficulty and under high temperature which may tend to degrade the copolymer. However, in the presence of tertiary diamines and bridgehead monoamines, metalation proceeds rapidly and smoothly. Some lithium compounds can be used alone effectively, notably the menthyllithium types.

Theoretically, though we do not wish to be bound by theory, it is presently believed likely that the metalation occurs at either a carbon to which an aromatic group is attached, or on an aromatic group, or at positions allylic to double bonds in the polymerized polybutadiene, or in more than one of these positions. In any event, it is believed that a very large number of lithium atoms are positioned variously along the polymer chain, attached to internal carbon atoms away from the polymer terminal carbon atoms, either along the backbone of the polymer or on groups pendant therefrom, or both, in a manner depending upon the distribution of reactive or lithiatable positions. This distinguishes the lithiated copolymer from simple terminally reactive polymers prepared by using a lithium or even a polylithium initiator in polymerization, thus limiting the number and the location of the positions available for subsequent attachment. With the metalation procedure described herein, the extent of the lithiation will depend upon the amount of metalating agent used and/or the groups available for metalation.

The polar compound promoters include a variety of tertiary amines, bridgehead amines, ethers, and metal alkoxides.

The tertiary amines useful in the metalation step have three saturated aliphatic hydrocarbon groups attached to each nitrogen and include, for example:

(A) Chelating tertiary diamines, preferably those of the formula $(R^2)_2N—C_{2y}H_y—N(R^2)_2$ in which $R^2$ can be the same or different straight- or branched-chain alkyl group of any chain length containing up to 20 carbon atoms or more all of which are included herein, and y can be any whole number from 2 to 10, and particularly the ethylene diamines in which all the alkyl substituents are the same. These include, for example: tetramethylethylenediamine, tetraethylenediamine, tetradecylethylenediamine, tetraoctylhexylenediamine, tetra(mixed alkyl)ethylenediamines, and the like.

(B) Cyclic diamines can be used, such as, for example, the N,N,N',N'-tetraalkyl-1,2-diaminocyclohexanes, the N,N,N,',N'-tetraalkyl-1,4-diaminocyclohexanes, N,N'-dimethylpiperazine, and the like.

(C) The useful bridgehead diamines include, for example, sparteine, triethylenediamine, and the like.

Tertiary monoamines such as triethylamine are generally not as effective in the lithiation reaction. However, bridgehead monoamines such as 1-azabicyclo-[2.2.2]octane and its substituted homologs are effective.

Ethers and the alkali metal alkoxides are presently less preferred than the chelating amines as activators for the metalation reaction due to somewhat lower levels of incorporation of nitrogen-containing compounds onto the copolymer backbone in the subsequent grafting reaction.

The milliequivalents of lithium employed for the desired amount of lithiation generally range from such as about 5 to 95, presently preferably about 10 20 per hundred grams of copolymer to be modified. Generally, equimolar amounts of the polar promoter and the lithium component (based on the carbon-bound lithium)

will be employed. The molar ratio of active lithium to the polar promoter can vary from such as 0.01:1 to 1.5:1. There appears to be little advantage, however, in using a molar ratio above about 1:1.

In general, it is most desirable to carry out the lithiation reaction in an inert solvent such as saturated hydrocarbons. Aromatic solvents such as benzene are lithiatable and may interfere with the desired lithiation of the hydrogenated copolymer. The solvent/copolymer weight ratio which is convenient generally is in the range of about 5:1 to 20:1. Solvents such as chlorinated hydrocarbons, ketones, and alcohols, should not be used because they destroy the lithiating compound.

The process of lithiation can be carried out at temperatures in the range of such as about −70° C. to +150° C., presently preferably in the range of about 0° C. to 100° C., the upper temperatures being limited by the thermal stability of the lithium compounds. The lower temperatures are limited by considerations of production rate, the rate of reaction becoming unreasonably slow at low temperatures. The length of time necessary to complete the lithiation and subsequent reactions is largely dependent upon the temperature. Generally the time can range from a few minutes to about 24 hours, presently preferably from about 30 minutes to 3 hours.

The extent of lithiation desired depends on the nature of the grafted product desired. A weight percent nitrogen of from about 0.01 to 5, preferably from 0.05 to 0.5, is suitable for providing detergency properties to the butadiene-styrene copolymers which are suitable as hydrocarbon fuel additives of our invention. The amount of lithiation required depends on the molecular weight of the backbone polymer, the molecular weight of the nitrogen-containing compound utilized in the grafting reaction, and the weight percent nitrogen desired in the product polymer of our invention.

Hydrogenation

The hydrogenation procedure employed should be effective so as to substantially reduce olefinic unsaturation, including vinyl unsaturation, while leaving essentially untouched aromatic unsaturation present in the styrene-derived portion of the copolymer. Hydrogenation can be conducted prior to metalation, or after metalation and grafting.

Hydrogenation can be conveniently conducted directly on the unquenched, non-metalated, non-grafted polymerization reaction admixture or alternatively, where convenient, the copolymer or the metalated and grafted copolymer can be quenched by addition of suitable amounts of a lower alcohol, water, or the like, to effectively kill active polymer-lithium species. When hydrogenation is to be conducted on the grafted polymer, steps must be taken to effectively remove residual nitrogen-containing, polar compound material metalation promoter and excess amine from the grafting step prior to hydrogenation since many of these nitrogen compounds tend to poison the hydrogenation catalyst. This removal can be accomplished by such as aqueous extraction or other techniques known and practiced by those skilled in the art. The quenched copolymer then can be coagulated and recovered, by means known in the art, such as by steam-stripping or coagulation with a non-solvent for the copolymer. For hydrogenation purposes, suitable copolymer or grafted copolymer can be dissolved or redissolved in a suitable hydrocarbon solvent, such as from among these described as for polymerization diluents. Hydrogenation is accomplished by treating the suitable butadiene/styrene copolymer dissolved in such a solvent, by means known in the art for this purpose.

Particularly favorable hydrogenation catalysts comprise reaction products of aluminum alkyl compounds with either nickel or cobalt carboxylates or alkoxides. Typical of the aluminum alkyl compounds are such as triisobutylaluminum, triethylaluminum, tri-n-propylaluminum, and the like. Exemplary nickel or cobalt carboxylates or alkoxides include the nickel and cobalt acetates, propionates, benzoates, octoates, and the butoxides, ethoxides, isopropoxides, and the like. Other suitable hydrogenation catalyst include reduced nickel-kieselguhr catalyst.

Exemplary hydrogenation conditions include hydrogenation of the grafted copolymer in a hydrocarbon diluent. Exemplary hydrogenation temperatures lie in the range of about 25° C. to 175° C. Pressures can range up to such as about 1,000 psig (6895 KPa). Times can range from a few minutes, such as about 30 minutes, to several hours, such as 4 hours or more, influenced not only by the temperature and pressure chosen, but also by the concentration of the copolymer in the diluent, since this affects the viscosity of the copolymeric solution being treated.

By effective selective hydrogenation, wherein substantially complete reduction of olefinic double bonds is obtained, the reduction of at least about 95 weight percent or more of the olefinic groups will have been obtained, and about 5 percent or less of the phenyl groups will have been hydrogenated.

Following completion of the hydrogenation step, the hydrogenation catalyst must be deactivated and removed to avoid interference if metalation and grafting steps are to follow. Conveniently, the total hydrogenation reaction mixture can be treated to deactivate the residual catalyst by any means known in the art. A typical procedure includes the addition of an aqueous solution of such as phosphoric acid and/or ammonium phosphate in such as about a 1:4 weight ratio, followed by introduction of air to convert the catalyst metals to insoluble phosphates, and removal thereof by filtration. The hydrogenated copolymer can be recovered by known methods, such as alcohol coagulation or steam stripping, and dried under reduced pressure. Alternatively, where the hydrogenated copolymer already has been grafted, the polymer cement, i.e., the hydrogenated grafted copolymer still dissolved in diluent, but after removal of the catalyst residues, can be employed as the detergent concentrate as such, or, if desired, after removal of partial diluent, by such as flashing, to provide a more concentrated concentrate.

Alternatively, the polymer cement, i.e., the hydrogenated copolymer still dissolved in the diluent employed, after removal of the catalyst residues, can be dried by conventional means and the metalation and grafting steps then conducted on the dried, i.e., water free, polymer cement, the entire process from polymerization through grafting thus being readily adaptable to continuous operation.

Alternatively, a suitable hydrogenated copolymer of hereinbefore described characteristics can be dissolved in a suitable hydrocarbon diluent for the metalation and grafting steps in accordance with our invention, or yet, in a further alternative method, a suitable grafted copolymer of hereinafter described characteristics can be dissolved in a suitable hydrocarbon diluent and hydrogenated as described hereinbefore.

Grafting Step

The lithiated copolymers are treated in solution, and without quenching in any manner to destroy the lithium sites, with a nitrogen-containing organic compound. The nitrogen-containing organic compounds are those suitable for reacting with the metalated copolymers to provide products exhibiting detergency properties to the final grafted nitrogen-containing hydrogenated copolymeric product.

The nitrogen-containing organic compounds suitable for use in this step can be described by the general formulae $X—Q—(NR_2^3)_n$ or $Y[Q—(NR_2^3)_n]_m$ wherein each $R^3$ is the same or different alkyl, cycloalkyl, or aryl radicals, or combination thereof; and Q is a hydrocarbon radical having a valence of n + 1 and is a saturated aliphatic, saturated cycloaliphatic, or aromatic radical, or combination thereof. X is a functional group capable of reacting on a one-to-one basis with one equivalent of polymer lithium. Nonlimiting examples of X include such as

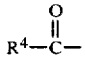

wherein $R^4$ is hydrogen, or an alkyl, cycloalkyl, or aryl radical or combination radical;

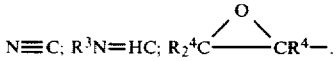

Y is or contains a functional group capable of reacting on a one-to-one basis with one equivalent of polymer lithium, such as a keto group or other similar group derived from or containing functional groups defined as X above. The n can be one or greater with the proviso that the value of n should preferably not exceed that which causes the nitrogen compound or the resulting modified polymer to be hydrocarbon insoluble; and m is 2 or 3. There is no known limit on the number of carbon atoms of any of $R^3$ or $R^4$ as far as operability is concerned. Nonlimiting examples of suitable nitrogen compounds include:

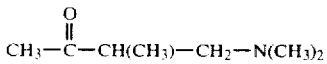

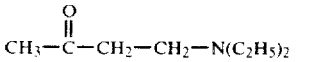

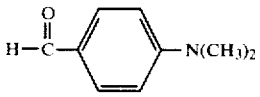

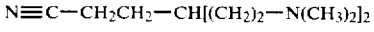

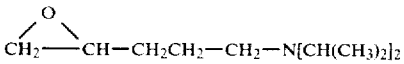

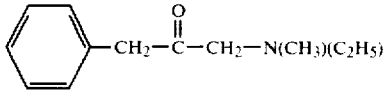

-continued

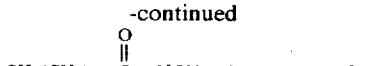

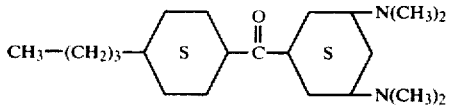

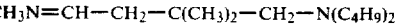

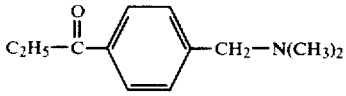

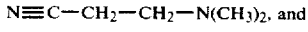 , and

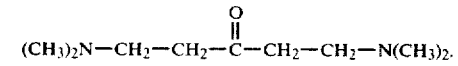 .

The grafting step is carried out under any suitable conditions to provide our modified copolymer having the desired nitrogen content, which we term a grafted copolymer. Generally, the grafting is done at an effective temperature in the range of such as about 0° C. to 100° C., for an effective time of such as about 0.01 to 10 hours, preferably using at least about one mole of suitable nitrogen-containing compound for each equivalent of copolymer lithium to insure substantially complete reaction of and utilization of the lithium. The grafting step is carried out immediately following the metalation step without prior separation or purification steps so as to preserve the lithium sites.

The modified polymer is recovered using any convenient means such as by coagulation treatment with a lower alcohol followed by filtration and any desired purification steps. For a typical procedure, see U.S. Pat. No. 4,022,589, column 2, line 66, column 3, line 2.

EXAMPLES

Examples provided are designed to further an understanding of our invention, without limiting the scope thereof. Particular species employed, particular conditions, amounts and materials, ranges and materials, and the like, are intended to be exemplary and not limitative of the scope of our invention.

EXAMPLE I

This example demonstrates the preparation of a hydrogenated nitrogen-containing, low molecular weight butadiene/styrene copolymer suitable for use as a gasoline detergent additive.

A 41/59 butadiene-styrene block copolymer was prepared by n-butyllithium initiated, solution polymerization, and the living polymer then metalated and allowed to react with 4-dimethylamino-3-methyl-2-butanone according to Recipe I:

| Recipe I | |
|---|---|
| Step I | |
| 1,3-Butadiene, parts by weight | 41 |
| Styrene, parts by weight | 59 |
| Cyclohexane, parts by weight | 700 |
| Tetrahydrofuran, parts by weight | 1.75 |
| n-Butyllithium, mhm[a] | 12.5[b] |
| Polymerization temperature, °C. | 70 |
| Polymerization time, hours | 0.5 |

-continued

| Recipe I | |
|---|---|
| Step II | |
| n-Butyllithium, mhm[a] | 12 |
| Tetramethylethylenediamine, mhm[a] | 24 |
| Reaction temperature, °C. | 70 |
| Reaction time, hours | 1.5 |
| Step III | |
| 4-Dimethylamino-3-methyl-2-butanone, mhm[a] | 24 |
| Reaction temperature, °C. | 70 |
| Reaction time, hours | 0.05 |

[a]mhm = Gram millimoles per 100 grams of total monomers.
[b]Effective n-butyllithium available for polymerization initiation. An additional 1.35 mhm was added to scavenge the fast poisons in the feed stock.

The polymerization and grafting reactions were carried out employing essentially anhydrous reagents and conditions under an inert atmosphere (nitrogen) in a 26 ounce (0.77 liter) beverage bottle equipped with a perforated crown cap over a self-sealing rubber gasket. The bottle and its contents were tumbled to assure good mixing in a 70° C. constant temperature bath for the time periods designated for each step. Following completion of Step III, about 1.6 parts by weight of ethanol was added to the reaction mixture with adequate agitation to insure deactivation of all of the organolithium, and the reaction mixture then extracted with consecutive batches of water until the aqueous extract was essentially neutral to indicator paper. The organic layer was stored over Linde 4A molecular sieves and activated alumina for approximately 15 hours before concentration of the nitrogen-containing polymer organic solution. The remaining solvent was removed from the polymer mixture under reduced pressure at 75° C. in a rotary evaporator.

Properties of the isolated nitrogen-containing copolymer are shown in Table I:

TABLE I

Properties of 4-Dimethylamino-3-methyl-2-butanone Modified Butadiene-Styrene Copolymer

| | |
|---|---|
| Molecular weight, $M_w$[a] | 8,800 |
| Molecular weight, $M_n$[a] | 7,900 |
| Heterogeneity index, $M_w/M_n$ | 1.12 |
| Inherent viscosity[b] | 0.15 |
| Gel, weight percent[c] | 0 |
| Trans, percent [d] | 44.6 |
| Vinyl, percent[d] | 24.9 |
| Block styrene, weight percent[e] | 1.1 |
| Nitrogen, weight percent[f] | 0.13 |

[a]Molecular weights were determined from gel permeation chromatography curves by a procedure described by G. Kraus and C. J. Stacy, J. Poly. Sci. A-2 10, 657 (1972), and G. Kraus and C. J. Stacy, J. Poly Sci. Symposium No. 43,329 (1973).
[b]Inherent viscosity was determined according to a procedure given in U.S. Pat. No. 3,278,508, column 20, note [a] with the modification that the solution was not filtered through a sulfur absorption tube but rather through a fritted glass filter stick of grade C porosity and pressured directly into the viscometer.
[c]Gel determined according to procedure described in U.S. Pat. No. 3,278,508, column 20, Note [b].
[d]Trans and vinyl content determined by infrared absorption spectroscopy. Represents the percentage of the total unsaturated bonds in the polybutadiene portion of the copolymer which are in the form of trans or vinyl unsaturation.
[e]Block polystyrene content determined using oxidative degradation procedure based on I. M. Kolthoff, T. S. Lee, and C. W. Carr, J. Poly. Sci. 1, 479 (1946).
[f]Nitrogen content determined using Dohramann Micro Coulometric Method.

A reduced nickel hydrogenation catalyst was prepared by the following procedure: one volume of 0.5M nickel 2-ethylhexanoate in cyclohexane was treated with two volumes of 0.5M triethylaluminum in cyclohexane to give a solution having an aluminum/nickel molar ratio of 2/1, and having a nickel concentration of 0.167M.

About 80 g of the dried, nitrogen-containing butadiene/styrene copolymer prepared according to Recipe I was dissolved in 800 ml of cyclohexane in a ½-gallon (1.89 liters) capacity glass-lined reactor. The reactor and its contents were purged thoroughly with nitrogen prior to addition of sufficient reduced nickel solution to provide 5 millimoles of nickel per 100 grams of nitrogen-containing copolymer. While maintaining the temperature at about 50° C. and with continuous stirring, hydrogen was added at a constant pressure of 345 KPa for 0.5 hour. The reaction solution was divided equally and transferred into two 26 oz. beverage bottles, and to each bottle of reaction solution was added 2 ml of 45/55 by weight ammonium phosphate/water and the bottles and their contents tumbled at 50° C. in a constant temperature bath for 0.5 hour. The bottles were then pressured with air at about 172 KPa, and tumbled at 50° C. for an additional 16 to 18 hours.

The reaction solution was then filtered through a 10 micron Millipore filter, followed by concentration under reduced pressure using a rotary evaporator, and finally the reclaimed polymer further dried under reduced pressure at 50° C. for about 15 hours. The hydrogenated nitrogen-containing butadiene/styrene copolymer had a trans content of 1.3 percent (mole percent of the total polymerized 1,3-butadiene) and no detectable vinyl unsaturation. This hydrogenated nitrogen-containing copolymer was tested as a fuel additive in Examples II and III. It can be noted that the hydrogenated grafted copolymer, after removal of catalyst residues, and while still dissolved in cyclohexane diluent, can be used as is, or as partially concentrated, as a detergent concentrate without the commercially expensive recovery and redissolving steps.

EXAMPLE II

The hydrogenated nitrogen-containing butadiene styrene copolymer prepared in Example I was tested as a gasoline additive in a laboratory gasoline deposit test. The raw gasoline stock for this test was a commercial automotive premium unleaded gasoline containing oxidation inhibitor but no other additives. The raw gasoline stock was passed through a 10 micron Millipore filter after which 5 ml of a toluene solution containing 0.5 grams of sulfurized terpene was added to 395 ml of the filtered raw gasoline stock. This procedure produced the base gasoline stock for testing with and without the additive of this invention.

The test procedure utilized was a modification of the method described in "A Bench Technique for Evaluating the Induction System Deposit Tendencies of Motor Gasolines," A. A. Johnstone and E. Dimitroff (Society of Automotive Engineers, Fuels and Lubricants Meeting, Houston, Tex., Nov. 1-3, 1966, Paper No. 660783). Briefly, in accordance with the modified procedure, the test gasoline (2 ml/min) was mixed with a flow of air (30 $ft.^3$/hr.) to form a gasoline-air mixture. This mixture was discharged from a nozzle as a spray against an aluminum deposit pan of known weight. The deposit pan was preheated to 375° F. (190° C.) and maintained at that temperature while spraying exactly 250 ml of the base gasoline stock, with and without the invention additive, onto the surface of the pan. After terminating the gasoline flow, the pan was allowed to cool to room temperature, and the pan then washed twice in boiling heptane and then rinsed with heptane and air dried. Weighing of the dried pan provided the weight of deposits in milligrams per 250 ml of base gasoline stock.

Results obtained using the above-described test on the base gasoline stock without and with 0.125 gram of the hydrogenated nitrogen-containing butadiene/styrene copolymer per 250 ml of the base gasoline stock are shown in Table II:

TABLE II

| Fuel | Deposits (mg) |
|---|---|
| Base Gasoline | 28.4 |
| Base Gasoline with Additive | 0.3 |

These data show the reduced deposit formation of the invention composition containing the hydrogenated, nitrogen-containing butadiene/styrene copolymer as a fuel additive.

EXAMPLE III

A carburetor detergency test was carried out to test the hydrogenated, nitrogen-containing butadiene/styrene copolymer prepared in Example I as a motor fuel additive. Briefly, the test procedure involved use of the test gasoline in a 170-cubic inch displacement, 6-cylinder automobile engine with a removable carburetor throat insert. Operations of the engine was for 23 continuous hours at 1800 rpm and 11.4 brake horsepower. The removable insert was washed with n-heptane after the engine operation and was weighed to give the weight of deposits formed. The base gasoline was a commercial premium unleaded gasoline. The results obtained using the base gasoline with and without the invention additive are given in Table III:

TABLE III

| | Deposits (mg) | |
|---|---|---|
| | Additive Level 1[a] | Additive Level 2[b] |
| Base Gasoline | 14.8 | 14.8 |
| Base Gasoline with Additive | 12.8 | 8.2 |

[a]Gasoline contained 5 pounds (2.3 kilograms) of hydrogenated, nitrogen-containing butadiene/styrene copolumer per 1000 barrels.
[b]Gasoline contained 10 pounds (4.5 kilograms) of hydrogenated, nitrogen-containing butadiene/styrene copolymer per 1000 barrels.

These results show reduced deposit formation using the hydrogenated, nitrogen-containing butadiene/styrene copolymer as a gasoline detergent additive.

EXAMPLE [III] *IV*

A carburetor detergency test as described in Example II was carried out on a hydrogenated, nitrogen-containing 41/59 butadiene/styrene copolymer similar to the polymer prepared in Example I with the exception that it was a higher molecular weight polymer. This higher molecular weight polymer is a good dispersant viscosity index improver for lubricating oils, and is described in U.S. Pat. No. 4,145,298. Properties of this polymer are shown in Table IV:

TABLE IV

| Properties of 4-Dimethylamino-3-methyl-2-butanone Modified High Molecular Weight Hydrogenated Butadiene-Styrene Copolymer | |
|---|---|
| Molecular weight, $M_w$ | 67,000 |
| Molecular weight, $M_n$ | 52,000 |
| Hetergeneity index, $M_w/M_n$ | 1.29 |
| Inherent viscosity | 0.78 |
| Gel, weight percent | 0 |
| Nitrogen, weight percent | 0.12 |

The results of the carburetor detergency test are shown in Table V:

TABLE V

| Fuel | Deposits (mg) |
|---|---|
| Base Gasoline | 12.4 |
| Base GAsoline with Additive[a] | 36.3 |

[a]High molecular weight, hydrogenated nitrogen-containing 41/59 butadiene/styrene copolymer added to base gasoline at a level of 10 pounds (4.5 kilograms) per 1000 barrels.

These data illustrate that the high molecular weight hydrogenated nitrogen-containing 41/59 butadiene/styrene copolymer, which has been demonstrated elsewhere to be an effective dispersant viscosity index improver for lubricating oils, is not suitable for use as a gasoline detergent additive, its presence actually resulting in the formation of a large amount of carburetor deposits.

The disclosure, including data, illustrate the value and effectiveness of our invention. The examples, the knowledge and background of the field of the invention and general priciples of chemistry and other applicable sciences, have formed the bases from which the broad descriptions of the invention including the ranges of conditions and generic groups of operant components have been developed, which have formed the bases for our claims here appended.

We claim:

1. Hydrocarbon fuel compositions exhibiting carburetor detergency properties comprising a major amount of a liquid hydrocarbon fuel and a minor effective amount of gasoline-soluble nitrogen-containing organic compound-grafted, hydrogenated conjugated diene/monovinylarene copolymer dissolved therein, said copolymer having a polymerized monovinylarene content of about 20 to 70 weight percent, with the proviso that when said copolymer contains a random block the block polymonovinylarene content is less than about 35 weight percent, a number average molecular weight suitable for gasoline solubility and in the range of about 1,000 to 10,000, the extent of hydrogenation of said copolymer such that about at least about 95 weight percent of olefinic double bonds having been saturated and less than about 5 weight percent of aromatic double bonds having been saturated, said copolymer characterized as having been prepared by the process which comprises reacting a metalated, conjugated diene hydrocarbon/monovinylarene hydrocarbon copolymer, optionally hydrogenated, with effective amounts of at least one nitrogen-containing organic compound represented by the general formulae $X—Q—(NR_2^3)_n$ or $Y[-Q—(NR_2^3)_n]_m$ wherein each $R^3$ is the same or different alkyl, cycloalkyl, aryl, or combination radical, Q is a hydrocarbon radical having a valence of n+1 and is a saturated aliphatic, saturated cycloaliphatic, aromatic or combination radical, X is a functional group capable of reaction on a one-to-one basis with one equivalent of polymer metal, Y is or contains a functional group capable of reacting on a one-to-one basis with one equivalent of polymer metal, n is at least one, and m is 2 or 3, and wherein if said metalated copolymer has not previously been hydrogenated, subsequently hydrogenating said grafted copolymer.

2. The composition of claim 1 wherein X is selected from

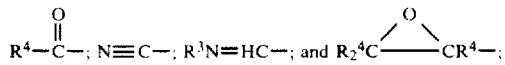

wherein each $R^4$ is the same or different and is hydrogen, or an alkyl, cycloalkyl, aryl, or combination radical.

3. The composition according to claim 1 wherein the hydrogenated, nitrogen-containing grafted copolymer has a number average molecular weight in the range of about 1,000 to 10,000, a vinyl unsaturation content prior to hydrogenation of about 20 to 95 percent, and a nitrogen content of about 0.01 to 5 weight percent.

4. The composition according to claim 3 wherein said hydrogenated, nitrogen-containing, grafted copolymer has a number average molecular weight in the range of about 5,500 to 8,500, and a vinyl unsaturation content prior to hydrogenation of about 20 to 70 percent.

5. The composition according to claim 4 wherein the hydrocarbon fuel is an unleaded motor fuel having a boiling point in the range of about 70° F. to 450° F., and said nitrogen-containing grafted, hydrogenated copolymer exhibits a nitrogen content in the range of about 0.05 to 0.5 weight percent.

6. The composition according to claim 5 employing said hydrogenated, nitrogen-containing grafted copolymer in the range of about 1 to 30 pounds per 1,000 barrels of fuel excluding other additives.

7. The composition according to claim 6 wherein said nitrogen-containing organic compound is selected from the group consisting of $CH_3-\overset{O}{\overset{\|}{C}}-CH(CH_3)-CH_2-N(CH_3)_2$ $CH_3-\overset{O}{\overset{\|}{C}}-CH_2-CH_2-N(C_2H_5)_2$

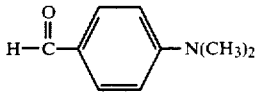

$N\equiv C-CH_2CH_2-CH[(CH_2)_2-N(CH_3)_2]_2$

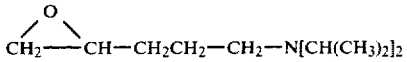

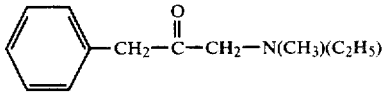

$CH_3(CH_2)_5-\overset{O}{\overset{\|}{C}}-C[CH_2-N(C_6H_5)(CH_3)]_3$

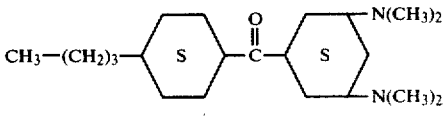

$CH_3N=CH-CH_2-C(CH_3)_2-CH_2-N(C_4H_9)_2$

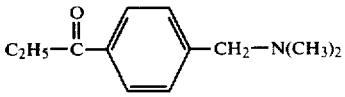

$N\equiv C-CH_2-CH_2-N(CH_3)_2$, and

-continued $(CH_3)_2N-CH_2-CH_2-\overset{O}{\overset{\|}{C}}-CH_2-CH_2-N(CH_3)_2.$

8. The composition according to claim 7 wherein said copolymer is a copolymer of butadiene and styrene, isoprene and styrene, butadiene and α-methylstyrene, or isoprene and α-methylstyrene.

9. The composition according to claim 8 wherein said hydrogenated copolymer is a 41/59 weight percent butadiene/styrene hydrogenated block copolymer having a block styrene content of about 1.1 weight percent, and said nitrogen-containing organic compound is 4-dimethylamino-3-methyl-2-butanone.

10. The composition according to claim 8 wherein said nitrogen-containing organic compound is 4-dimethylamino-3-methyl-2-butanone.

11. The composition according to claim 8 wherein said nitrogen-containing organic compound is p-dimethylaminobenzaldehyde.

12. The composition according to claim 8 wherein said nitrogen-containing organic compound is 3-dimethylaminoproprionitrile.

13. The composition according to claim 8 wherein said nitrogen-containing organic compound is 4-diethylamino-2-butanone.

14. The composition according to claim 8 wherein said nitrogen-containing organic compound is $N\equiv C-CH_2CH_2-CH[(CH_2)_2-N(CH_3)_2]_2$.

15. The composition according to claim 8 wherein said nitrogen-containing organic compound is

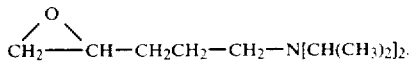

16. The composition according to claim 8 wherein said nitrogen-containing organic compound is

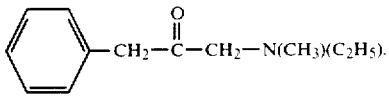

17. The composition according to claim 8 wherein said nitrogen-containing organic compound is $CH_3(CH_2)_5-\overset{O}{\overset{\|}{C}}-C[CH_2-N(C_6H_5)(CH_3)]_3.$

18. The composition according to claim 8 wherein said nitrogen-containing organic compound is

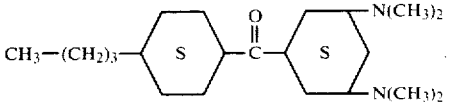

19. The composition according to claim 8 wherein said nitrogen-containing organic compound is $CH_3N=CH-CH_2-C(CH_3)_2-CH_2-N(C_4H_9)_2$.

20. The composition according to claim 8 wherein said nitrogen-containing compound is

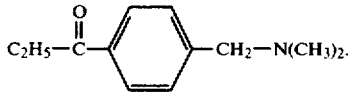

21. The composition according to claim 8 wherein said nitrogen-containing organic compound is

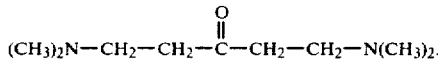

22. The composition of claim 1 wherein said conjugated diene/monovinyl arene copolymer is selected from copolymers represented by B/A, B/A-A, A-B, and mixtures, wherein B/A represents a randomized block of conjugated diene/monovinylarene, which can be tapered; A represents homopolymeric block of polymerized monovinylarene; and B represents a block of conjugated diene homopolymer.

23. The composition of claim 1 wherein said conjugated diene/monovinyl arene copolymer contains a random block B/A, and wherein the block polystyrene content is in the range of less than about 35 weight percent.

24. The composition of claim 1 employing in said hydrocarbon fuel said nitrogen-containing grafted hydrogenated copolymer in an amount of about 1 to 30 lbs. per 1000 bbls of the fuel.

25. The composition of claim 1 wherein said hydrocarbon fuel is an unleaded motor fuel having a boiling point in the range of about 70° F. to 450° F., and said hydrogenated grafted copolymer is employed in an amount of about 2 to about 20 pounds per 1,000 barrels of fuel excluding other additives.

26. The composition of claim 1 wherein said hydrocarbon fuel is an aviation fuel wherein said hydrogenated grafted copolymer is employed in an amount of about 1 to about 30 pounds per 1,000 barrels of fuel.

27. The compositions according to claim 1 wherein said $X[Q—(NR_2^3)_n]_m$ or $Y[Q—(NR_2^3)_n]_m$ is said $X—Q—(NR_2^3)_n$.

28. An additive concentrate comprising about 10 to 70 weight percent of a detergent additive in a solvent, wherein said detergent additive is a nitrogen-containing organic compound-grafted hydrogenated conjugated diene/monovinylarene copolymer, said copolymer having a polymerized monovinylarene content of about 20 to 70 weight percent, with the proviso that when said copolymer contains a random block the block polymonovinylarene content is less than about 35 weight percent, a number average molecular weight suitable for gasoline solubility and in the range of about 1,000 to 10,000, the extent of hydrogenation of said copolymer such that about at least 95 weight percent of olefinic double bonds having been saturated and less than about 5 weight percent of aromatic double bonds having been saturated, said copolymer characterized as having been prepared by the process which comprises reacting a metalated conjugated diene hydrocarbon/-monovinylarene hydrocarbon copolymer, optionally hydrogenated, with effective amounts of at least one nitrogen-containing organic compound represented by the general formulae $X—Q—(NR_2^3)_n$ or $Y[-Q—(NR_2^3)_n]_3$ wherein each $R^3$ is the same or different alkyl, cycloalkyl, aryl, or combination radical, Q is a hydrocarbon radical having a valence of n+1 and is a saturated aliphatic, saturated cycloaliphatic, aromatic or combination radical, X is a functional group capable of reaction on a one-to-one basis with one equivalent of polymer metal, Y is or contains a functional group capable of reacting on a one-to-one basis with one equivalent of polymer metal, n is at least one, m is 2 or 3, and wherein if said copolymer has not previously been hydrogenated, subsequently hydrogenating said grafted copolymer.

29. The additive concentrate according to claim 28 wherein said nitrogen-containing organic compound is selected from the group consisting of

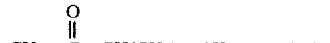

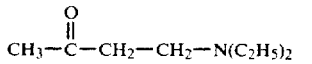

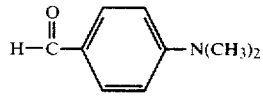

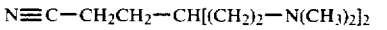

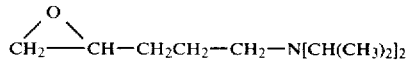

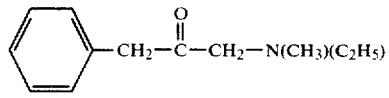

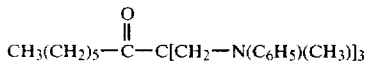

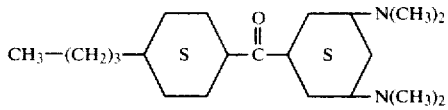

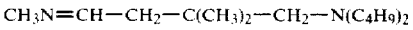

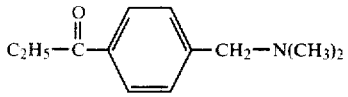

and

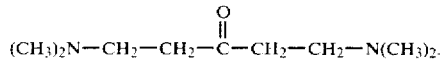

30. The additive concentrate according to claim 29 wherein said copolymer is a copolymer of butadiene and styrene, isoprene and styrene, butadiene and α-methylstyrene, or isoprene and α-methylstyrene.

31. The additive concentrate according to claim 30 wherein said hydrogenated copolymer is a 41/59 weight percent butadiene/styrene hydrogenated block copolymer having a block styrene content of about 1.1 weight percent, and said nitrogen-containing organic compound is 4-dimethylamino-3-methyl-2-butanone.

32. The additive concentrate according to claim 30 wherein said nitrogen-containing organic compound is 4-dimethylamino-3-methyl-2-butanone.

33. The additive concentrate according to claim 30 wherein said nitrogen-containing organic compound is p-dimethylaminobenzaldehyde.

34. The additive concentrate according to claim 30 wherein said nitrogen-containing organic compound is 3-dimethylaminopropionitrile.

35. The additive concentrate according to claim 30 wherein said nitrogen-containing organic compound is 4-diethylamino-2-butanone.

36. The additive concentrate according to claim 30 wherein said nitrogen-containing organic compound is $N{\equiv}C{-}CH_2CH_2{-}CH[(CH_2)_2{-}N(CH_3)_2]_2$.

37. The additive concentrate according to claim 30 wherein said nitrogen-containing organic compound is

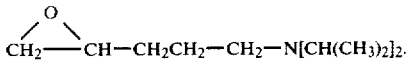

38. The additive concentrate according to claim 30 wherein said nitrogen-containing organic compound is

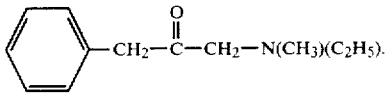

39. The additive concentrate according to claim 30 wherein said nitrogen-containing organic compound is

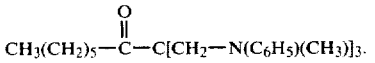

40. The additive concentrate according to claim 30 wherein said nitrogen-containing organic compound is

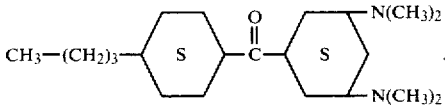

41. The additive concentrate according to claim 30 wherein said nitrogen-containing organic compound is $CH_3N{=}CH{-}CH_2{-}C(CH_3)_2{-}CH_2{-}N(C_4H_9)_2$.

42. The additive concentrate according to claim 30 wherein said nitrogen-containing organic compound is

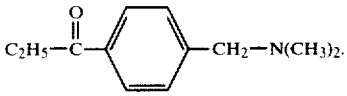

43. The additive concentrate according to claim 30 wherein said nitrogen-containing organic compound is

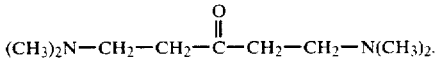

44. The additive concentrate of claim 28 wherein said conjugated diene/monovinyl arene copolymer is selected from copolymers represented by B/A, B/A-A, A-B, and mixtures, wherein B/A represents a randomized block of conjugated diene/monovinylarene, which can be tapered; A represents homopolymeric block of polymerized monovinylarene; and B represents a block of conjugated diene homopolymer.

45. The additive concentrate of claim 28 wherein said conjugated diene/monovinyl arene copolymer contains a random block B/A, and wherein the block polystyrene content is in the range of less than about 35 weight percent.

46. The additive concentrate according to claim 28 wherein said $X[Q{-}(NR_2^3)_n]_m$ or $Y[Q{-}(NR_2^3)_n]_m$ is said $X{-}Q{-}(NR_2^3)_n$.

*47. Nitrogen-containing organic compound-grafted, hydrogenated, conjugated diene/monovinylarene copolymers having a polymerized monovinylarene content of about 20 to 70 weight percent with the proviso that when said copolymer contains a random block the block polymonovinylarene content is less than about 35 weight percent, a number average molecular weight in the range of about 1,000 to 10,000, at least about 95 weight percent of olefinic of said copolymer double bonds hydrogenated and less than about 5 weight percent of aromatic double bonds hydrogenated, prepared by the process which comprises reacting a metalated, conjugated diene hydrocarbon/-monovinylarene hydrocarbon copolymer, optionally hydrogenated, with effective amounts of at least one nitrogen-containing organic compound represented by the general formulae $X{-}Q{-}(NR_2^3)_n$ or $Y[Q{-}(NR_2^3)_n]_m$ wherein each $R^3$ is the same or different alkyl, cycloalkyl, aryl, or combination radical, Q is a hydrocarbon radical having a valence of $n+1$ and is a saturated aliphatic, saturated cycloaliphatic, aromatic or combination radical, X is a functional group capable of reaction on a one-to-one basis with one equivalent of polymer metal, Y is or contains a functional group capable of reacting on a one-to-one basis with one equivalent of polymer metal, n is at least one, and m is 2 or 3, and wherein when said metalated copolymer has not previously been hydrogenated, subsequently hydrogenating said grafted copolymer.*

*48. The copolymer of claim 47 wherein X is selected from*

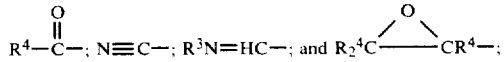

*wherein each $R^4$ is the same or different and is hydrogen, or an alkyl, cycloalkyl, aryl, or combination radical.*

*49. The copolymer according to claim 47 wherein the copolymer exhibits a vinyl unsaturation content prior to hydrogenation of about 20 to 95 percent; and the nitrogen content of said copolymers about 0.01 to 5 weight percent.*

*50. The copolymer according to claim 49 wherein said grafted hydrogenated copolymer has a number average molecular weight in the range of about 5.500 to 8,500, and a vinyl unsaturation content prior to hydrogenation of about 20 to 70 percent.*

*51. The copolymer according to claim 50 wherein grafted, hydrogenated copolymer has a nitrogen content in the range of about 0.05 to 0.5 weight percent.*

*52. The copolymer according to claim 47 wherein said nitrogen-containing organic compound is selected from the group consisting of*

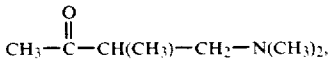

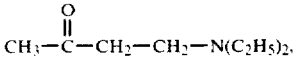

-continued

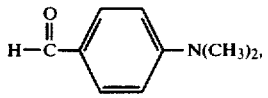

$N\equiv C-CH_2CH_2-CH[(CH_2)_2-N(CH_3)_2]_2$,

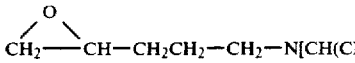

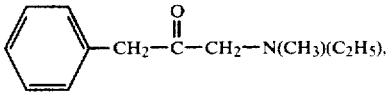

$CH_3(CH_2)_5-C(=O)-C[CH_2-N(C_6H_5)(CH_3)]_3$,

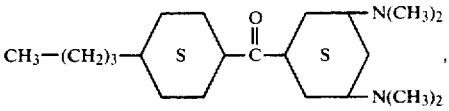

$CH_3N=CH-CH_2-C(CH_3)_2-CH_2-N(C_4H_9)_2$,

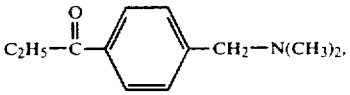

$N\equiv C-CH_2-CH_2-N(CH_3)_2$, and

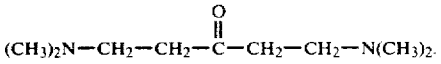

*53. The copolymer according to claim 52 wherein said copolymer is a copolymer of butadiene and styrene, isoprene and styrene, butadiene and α-methylstyrene, or isoprene and α-methylstyrene.*

*54. The copolymer according to claim 53 wherein said hydrogenated copolymer is a 41/59 weight percent butadiene/styrene hydrogenated block copolymer having a block styrene content of about 1:1 weight percent, and said nitrogen-containing organic compound is 4-dimethylamino-3-methyl-2-butanone.*

*55. The copolymer according to claim 53 wherein said nitrogen-containing organic compound is 4-dimethylamino-3-methyl-2-butanone.*

*56. The copolymer according to claim 53 wherein said nitrogen-containing organic compound is p-dimethylaminobenzaldehyde.*

*57. The copolymer according to claim 53 wherein said nitrogen-containing organic compound is 3-dimethylaminoproprionitrile.*

*58. The copolymer according to claim 53 wherein said nitrogen-containing organic compound is 4-diethylamino-2-butanone.*

*59. The copolymer according to claim 53 wherein said nitrogen-containing organic compound is* $N\equiv C-CH_2CH_2-CH[(CH_2)_2-N(CH_3)_2]_2$.

*60. The copolymer according to claim 53 wherein said nitrogen-containing organic compound is*

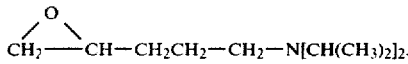

*61. The copolymer according to claim 53 wherein said nitrogen-containing organic compound is*

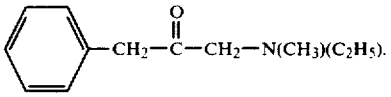

*62. The copolymer according to claim 53 wherein said nitrogen-containing organic compound is*

$CH_3(CH_2)_5-C(=O)-C[CH_2-N(C_6H_5)(CH_3)]_3$.

*63. The copolymer according to claim 53 wherein said nitrogen-containing organic compound is*

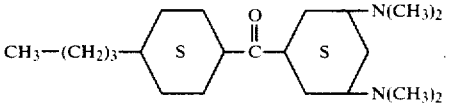

*64. The copolymer according to claim 8 wherein said nitrogen-containing organic compound is*

$CH_3N=CH-CH_2-C(CH_3)_2-N(C_4H_9)_2$.

*65. The copolymer according to claim 53 wherein said nitrogen-containing compound is*

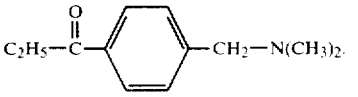

*66. The copolymer according to claim 53 wherein said nitrogen-containing organic compound is*

$(CH_3)_2N-CH_2-CH_2-C(=O)-CH_2-CH_2-N(CH_3)_2$.

*67. The copolymer of claim 47 wherein said conjugated diene/monovinyl arene copolymer is selected from copolymers represented by B/A, B/A-A, A-B, and mixtures, wherein B/A represents a randomized block of conjugated diene/monovinylarene, which can be tapered; A represents a homopolymeric block of polymerized monovinylarene; and B represents a block of conjugated diene homopolymer.*

*68. The copolymer of claim 47 wherein said conjugated diene/monovinyl arene copolymer contains a random block B/A, and wherein the block polystyrene content is in the range of less than about 35 weight percent.*

*69. The compositions according to claim 47 wherein said* $X[Q-(NR_2^3)_n]_m$ *or* $Y[Q-(NR_2^3)_n]_m$ *is said* $X-Q-(NR_2^3)_n$.

* * * * *

UNITED STATES PATENT AND TRADEMARK OFFICE

CERTIFICATE OF CORRECTION

PATENT NO. : Re. 32,533

DATED : October 27, 1987

INVENTOR(S) : William J. Trepka and Richard J. Sonnenfeld

It is certified that error appears in the above-identified patent and that said Letters Patent are hereby corrected as shown below:

Claim 28, col. 17, l. 66, delete "$Q - (NR_2^3)_n)_3$ and insert --- $Q - (NR_2^3)_n]_m$ ---.

Claim 54, col. 21, l. 44, delete "1:1" and insert --- 1.1 ---.

Claim 64, col. 22, l. 32, "before $N(C_4H_9)_2$" insert --- $CH_2$- ---.

Signed and Sealed this

Nineteenth Day of July, 1988

*Attest:*

DONALD J. QUIGG

*Attesting Officer*

*Commissioner of Patents and Trademarks*